C. B. WOODWORTH.
ANTISKID DEVICE FOR VEHICLE WHEELS.
APPLICATION FILED FEB. 9, 1916.
1,259,190.
Patented Mar. 12, 1918.
2 SHEETS—SHEET 2.
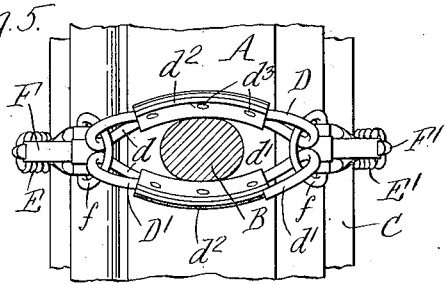
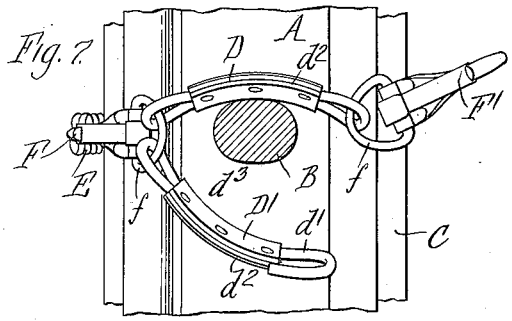
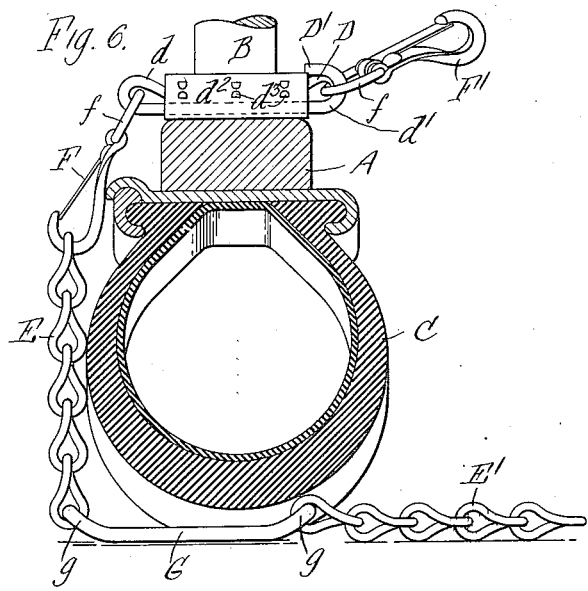
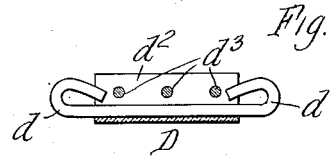
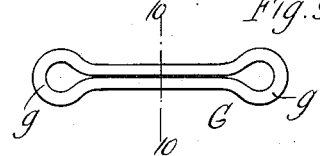
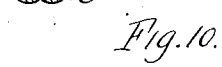
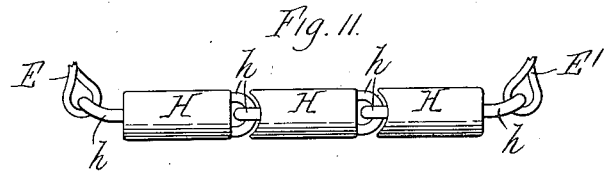
Inventor
Charles B. Woodworth.
By Wilhelm & Parker.
Attorneys.

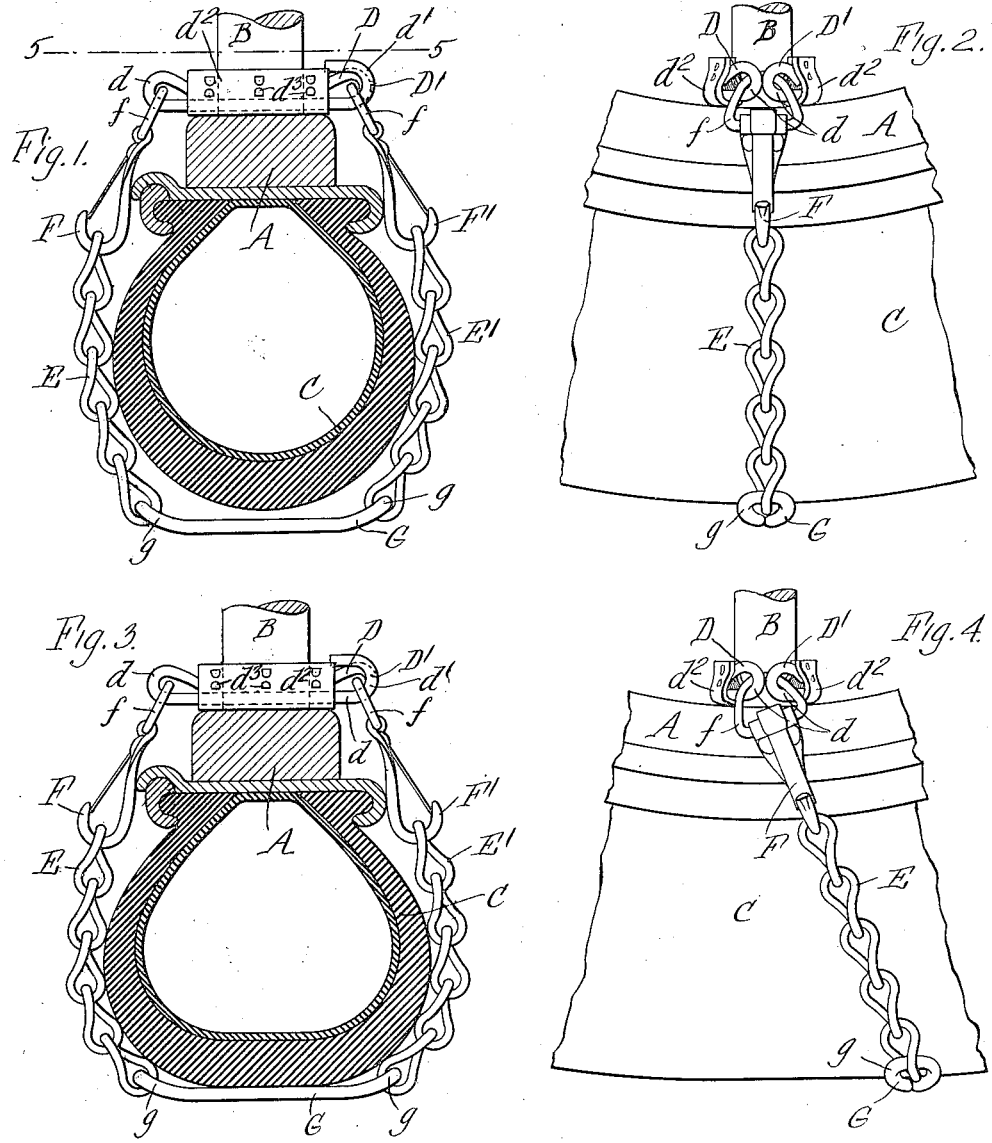

UNITED STATES PATENT OFFICE.

CHARLES B. WOODWORTH, OF NIAGARA FALLS, NEW YORK.

ANTISKID DEVICE FOR VEHICLE-WHEELS.

1,259,190.  Specification of Letters Patent.  Patented Mar. 12, 1918.

Application filed February 9, 1916. Serial No. 77,126.

*To all whom it may concern:*

Be it known that I, CHARLES B. WOODWORTH, a subject of the King of Great Britain, residing at Niagara Falls, in the county of Niagara and State of New York, have invented a new and useful Improvement in Antiskid Devices for Vehicle-Wheels, of which the following is a specification.

This invention relates to devices which are adapted to be fastened to the wheels of a vehicle to prevent the skidding or slipping of the same on the road, and more particularly to devices of this kind which are secured to the wheel spokes.

One of the objects of the invention is to produce an anti-skid device of this kind of improved construction in which the cross chain fits somewhat loosely around the wheel rim so that tread portions of the chain will not bear continuously against the same part of the tire and thus cause this part of the tire to wear out more rapidly than other parts; also to provide a device of this kind which can be easily attached to and detached from the wheel, and which has connecting means of improved and simplified construction; also to so construct the tread portions of a device of this kind that they will reduce the amount of chafing or wearing of the tire; also to improve the construction of devices of this kind in the respects specified.

In the accompanying drawings:

Figures 1 and 2 are respectively a fragmentary transverse sectional view partly in elevation and a fragmentary side elevation of a wheel and tire having an anti-skid device embodying the invention secured thereon.

Figs. 3 and 4 are similar views thereof, showing a portion of the tire when bearing against the road.

Fig. 5 is a sectional view thereof on line 5—5, Fig. 1.

Fig. 6 is a fragmentary transverse section partly in elevation of a wheel and tire showing the anti-skid device in position to be unhooked from the spoke.

Fig. 7 is a view similar to Fig. 5 showing the device unhooked and ready to be removed from the wheel.

Fig. 8 is a side view of one of the links for securing the device to the spokes, the covering of the link being shown in section.

Fig. 9 is a plan view of a tread link.

Fig. 10 is a transverse section thereof on line 10—10, Fig. 9.

Fig. 11 is a view of a tread link of modified construction.

A represents the rim, B the spokes, and C the resilient tire of a vehicle wheel. All of these parts may be of any suitable or desired construction.

Briefly stated, the anti-skid device shown in the drawings comprises two spoke-engaging members or links D D', two chain sections E E' arranged at the sides of the tire and connected with the spoke-engaging members by suitable means, such as snap hooks F F', one of which also has a detachable connection with one of the spoke-engaging members. The chain sections E E' are connected to a tread link G, which extends across the tread portion of the tire and which together with the chain sections E E' constitute the cross chain.

The spoke-engaging members or links D D' are made of rigid material and are preferably curved or bent so that, when arranged at opposite sides of a spoke, the ends of the members are in close proximity. The opposite ends of the member D are permanently secured to eyes $f$ of the snap hooks or connecting devices F F', preferably by bending the ends of the spoke-engaging members to form loops $d$ which interlink with the eyes of the snap hooks. The other member D' is also permanently connected at one end with the snap hook F in the same manner and is provided at its other end with a hook $d'$ which is preferably formed by bending the end of the spoke-engaging member D' first toward the axis of rotation of the wheel and then back on itself in a direction substantially parallel with the body portion of the member D'. The hook $d'$ is adapted to engage the eye of the snap hook F' and can be readily disengaged from the snap hook when it is desired to remove the device from the wheel, by raising the snap hook to approximately the position shown in Fig. 6, but cannot be disengaged from the eye of the snap hook when the snap hook is in operative position. The portions of the spoke-engaging members which are nearest to the spoke are preferably covered with leather or other covering $d^2$ which prevents scratching or injuring the spokes. The covering shown consists of a strip of leather bent around the members D D' and having its edges secured together by means of rivets or the like $d^3$.

The chain sections E E' may be of any suitable kind and the links thereof are preferably of such a shape as will permit the snap hooks to engage with any of the links of the chain sections, so that in case the anti-skid device is used on wheels and tires of different sizes, the length of the cross chain can be regulated as desired. The snap hooks, also, may be of any suitable construction, or if desired, could be replaced by connecting means of other construction.

The tread portion G of the cross chain shown in Figs. 1 to 10 comprises a link preferably made of a single piece of wire or rod of round cross-section, which is bent to form loops or eyes $g$ at its ends and in which the intermediate portions of the wire or rod lie close together and may, if desired, be pressed together so that the meeting faces thereof are slightly flattened, as shown in Fig. 10. The loops or end portions of the links are preferably bent to extend upwardly or toward the axis of the wheel when the load rests thereon, so that the chain parts E E' are kept out of contact with the ground. The tread link is made long enough so that the upwardly bent end portions thereof do not prevent the normal flattening of the tire at the points of contact with the road. The link described has no sharp edges or projections which may injure the tire and has more extended bearing surfaces on the road and on the tire than a chain of small links of the kind usually employed and consequently does not project into the tire as much as other chains. The tread portion described is superior to a tread chain, such, for example, like the chains E E', since the links of such a chain do not lie flatly against the ground when used as a tread portion, so that it frequently happens that the links change their positions when the load is applied, which results in chafing and rubbing on the tire, which greatly decreases the life of the tire. Such conditions cannot occur in the case of the tread link described, since the cross-section of the intermediate portion of the link is of very little greater breadth than thickness, so that even if the link does not at first strike the ground in the same position that it assumes when the load rests on it, any change in position of the tread link will result in very little chafing or rubbing on the tire. The tread link is inexpensive to make and is preferably made somewhat larger in cross-section than the links of the chains E E', so that the anti-skid device is more durable than those ordinarily used.

Fig. 11 shows a modified construction of the tread portion of the anti-skid device, which comprises a plurality of substantially cylindrical links H connected by means of eyes or loops $h$ at their end portions. A tread portion of this kind has a circular cross-section, so that there would be no chafing or grinding action on the tire when the links are pressed between the ground and the tire.

In applying the anti-skid device to or removing it from the wheel, the connecting device F' must first be raised substantially into the position shown in Fig. 6 in order to enable the hook $d'$ to be connected to or disconnected from the eye of the connecting device or snap hoop. Consequently when the snap hook is in operative relation, as shown in Figs. 1 to 5, it cannot be disconnected from the hook $d'$ even if there is considerable slack in the chain. Owing to the curvature of the spoke-engaging members and to their connection with the eyes of the snap hooks, these members cannot turn when the chain is secured on the wheel, to permit disengagement of the eye of the snap hook F', from the hook $d'$. The covering of the spoke-engaging members also normally assumes the position shown in Figs. 1 to 6, owing to the manner in which the edges project from the members, so that it closes the open portion of the hook $d'$. By bending the end portions of the tread link so that they extend toward the axis of the wheel, the link tends to take its normal position when it strikes the ground, so that there will be no tendency on the part of the tread portion to change its position when the load is applied thereto.

The anti-skid chain described has the further advantage that it can be loosely secured on the wheel so that the wear on the tire is distributed and so that the chain can be easily attached and detached from the wheel. The means for holding the chain on the wheel are simple in construction and the chain cannot be disconnected from the wheel without first unhooking the cross chain.

It is understood that the tread link can be used on anti-skid chains other than those fastened to the wheel spokes.

I claim as my invention:

1. A fastening device for attaching cross chains or the like to vehicle wheels, consisting of two securing devices connected with the opposite ends of a cross chain, and rigid bent links adapted to embrace a spoke of a wheel, one of said links having a hooked portion, the opening of which extends toward the axis of the wheel and which is connected with one of said securing devices, whereby said securing device cannot be unhooked until the same is disconnected from the cross chain.

2. An anti-skid device for vehicle wheels with resilient tires, including a chain extending transversely around the tire and a part which holds said chain in position on the tire, said chain having a tread portion consisting of a bar of round cross-section bent to form looped end portions, the parts of the bar constituting the intermediate part of the tread portion being arranged in close proximity to each other.

Witness my hand, this 3rd day of February, 1916.

CHARLES B. WOODWORTH.

Witnesses:
F. E. PROCHNOW,
A. L. McGEE.